United States Patent [19]
Murayama

[11] Patent Number: 5,396,382
[45] Date of Patent: Mar. 7, 1995

[54] CASSETTE INSERTING AND EJECTING APPARATUS FOR LOADING A TAPE CASSETTE IN A VTR

[75] Inventor: Osamu Murayama, Kanagawa, Japan

[73] Assignee: Sony Corporation, Tokyo, Japan

[21] Appl. No.: 127,572

[22] Filed: Sep. 28, 1993

[30] Foreign Application Priority Data

Sep. 30, 1992 [JP] Japan .................................. 4-285419

[51] Int. Cl.⁶ .......................................... G11B 5/008
[52] U.S. Cl. ................................................. 360/96.5
[58] Field of Search ............... 360/96.5, 132, 93, 96.6, 360/96.1; 242/199

[56] References Cited

U.S. PATENT DOCUMENTS

| | | | |
|---|---|---|---|
| 4,303,955 | 12/1981 | Kramer et al. | 360/96.5 X |
| 4,788,616 | 11/1988 | Sato | 360/96.5 |
| 4,803,575 | 2/1989 | Nishimura et al. | 360/96.5 X |
| 4,965,683 | 10/1990 | Otani | 360/96.5 X |
| 5,240,200 | 8/1993 | Nishimura et al. | 360/96.5 X |

*Primary Examiner*—Andrew L. Sniezek
*Attorney, Agent, or Firm*—William S. Frommer; Alvin Sinderbrand

[57] ABSTRACT

A cassette inserting and ejecting apparatus is provided for use with a tape cassette including a substantially rectangular body having a mouth in one long side portion thereof and containing a tape guided there across, a pivoted lid for movement between opened and closed positions in respect to the mouth, and guide grooves extending along upper and lower surfaces, respectively, of another side portion of the body which is parallel to and remote from the side portion having the mouth. Such apparatus has an insertion port through which the cassette can be inserted and ejected in a direction parallel with the grooves, a stage member mounted for movement vertically between a raised position at the level of the port for receiving the inserted cassette and a lowered position at which received cassette is operatively disposed. The stage member includes an elongated, channel-shaped side portion cross-sectionally configured to slidably embrace the grooved side portion of the cassette which is inserted into the stage member in the raised position, and an end portion directed laterally from an end of the channel-shaped side portion which is remote from the insertion port in the raised position. Elongated upper and lower guide members extending longitudinally within the channel-shaped side portion and are directed toward each other to be slidably engaged in the guide grooves in the upper and lower surfaces, respectively, of the cassette body so that the received cassette is held in a cantilevered manner.

5 Claims, 7 Drawing Sheets

CASSETTE INSERTING AND EJECTING APPARATUS FOR LOADING A TAPE CASSETTE IN A VTR

BACKGROUND OF THE INVENTION

1. Field of the Invention

This invention relates generally to a cassette inserting and ejecting apparatus and more particularly is applicable to a cassette inserting and ejecting apparatus for loading a tape cassette of, for example, a video tape recorder (VTR).

2. Description of the Related Art

Conventionally, a VTR, for example, is provided with a cassette inserting and ejecting apparatus for loading a tape cassette. For example, as shown in FIG. 1, when a tape cassette 3 is inserted into the main body of the VTR, a guide unit 1 corresponding to the outer configuration of the tape cassette 3 is disposed in the main body of the VTR in guiding the tape cassette.

More specifically, the guide unit 1 includes a lower half guide 2A with a flange 2B along one side for holding the lower side surface of the tape cassette 3 and a side surface guide 4C remote from the flange 2B for guiding the surface of the tape 3 which is remote from the cassette lid 3A. Further, the guide unit 1 includes a roller unit 4 composed of rollers 4A and 4B for bearing down on the upper surface of the tape cassette 3 so that the tape cassette 3 is pressed against the lower half guide 2A.

Therefore, the tape cassette 3 is guided in the side surface or lateral direction thereof by the bent potion or flange 2B of the lower half guide 2A and the side surface guide 4C as well as guided in the upward and downward directions thereof by the lower half guide 2A and the roller unit 4.

Incidentally, since the illustrated type of the tape cassette 3 is provided with a lid 3A for protecting the tape surface, a problem arises in that positioning accuracy in the lateral direction of the tape cassette is deteriorated because of play between the lid 3A and the main body of the tap cassette 3.

Further, there is also a problem in that the size of the guide 1 is unavoidably increased by the thickness H of the roller unit 4 provided for pressing the tape cassette 3 downwardly against the lower half guide 2A.

SUMMARY OF THE INVENTION

In view of the foregoing, an object of this invention is to provide a cassette inserting and ejecting in which correct positioning accuracy can be obtained with an arrangement of relatively smaller size.

The foregoing, and other objects of this invention have been achieved by the provision of a cassette inserting and ejecting apparatus by which a cassette inserted through an inserting port is carried downwardly to a predetermined loading position and the cassette is raised from the loading position and ejected through the inserting port, such cassette inserting and ejecting apparatus comprising projecting guides extending in the direction of the cassette and engaging in guide grooves defined in the cassette during the inserting and ejecting operations.

Further, the projecting guides are disposed to be engaged with the guide grooves defined in two opposed surfaces of the cassette adjacent a side of the cassette so that the latter is supported in a cantilevered manner.

Further, the cassette held by the projecting guides in a cantilevered manner is also positioned by a predetermined positioning means engaging the cassette adjacent the side of the latter remote from the guide grooves.

Further, in accordance with an aspect of the invention, a cassette inserting and ejecting apparatus by which a cassette is inserted through an inserting port and then lowered to a predetermined loading position comprises: a first movement means abutted against a loading side surface of the cassette when the cassette 22 is inserted through the inserting port and moved by the cassette being inserted, an elastic member for producing an urging force as the first movement means is moved by the insertion of the cassette, and second movement means for moving the cassette to a lowered loading position by the urging force of the elastic member when the cassette is inserted to a predetermined position in the inserting direction.

In accordance with another aspect of the invention, a cassette inserting and ejecting apparatus, as aforesaid, the second movement means is moved in a predetermined moving direction by a suitable drive means and, in response thereto, the cassette located at the loading position is moved to a predetermined ejection start position whereupon, the elastic member which has been loaded to produce an urging force in response to movement of the second movement means acts on the first movement means for ejecting the cassette through the inserting port by the urging force of the elastic member when the cassette is moved to the ejection start position.

As described above, according to this invention, since a tape cassette is supported by the guide rails and the tape cassette is inserted and ejected by the elastic force of the elastic member, a cassette inserting and ejecting apparatus with a smaller size can be realized.

DETAILED DESCRIPTION OF THE EMBODIMENT

Figure 2:
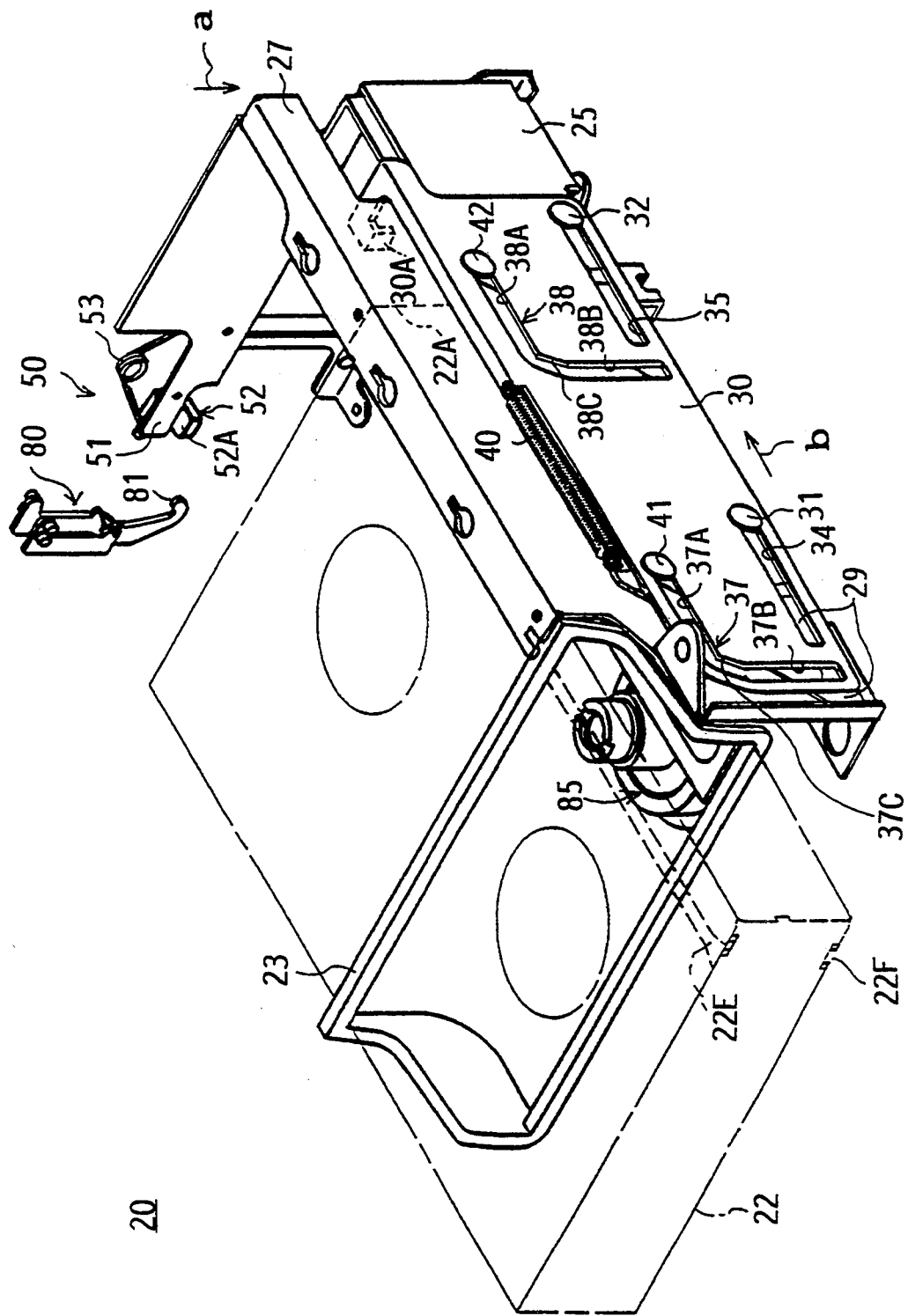
FIG. 2 is a perspective view showing an embodiment of a cassette inserting and ejecting apparatus according to this invention.
Figure 3:
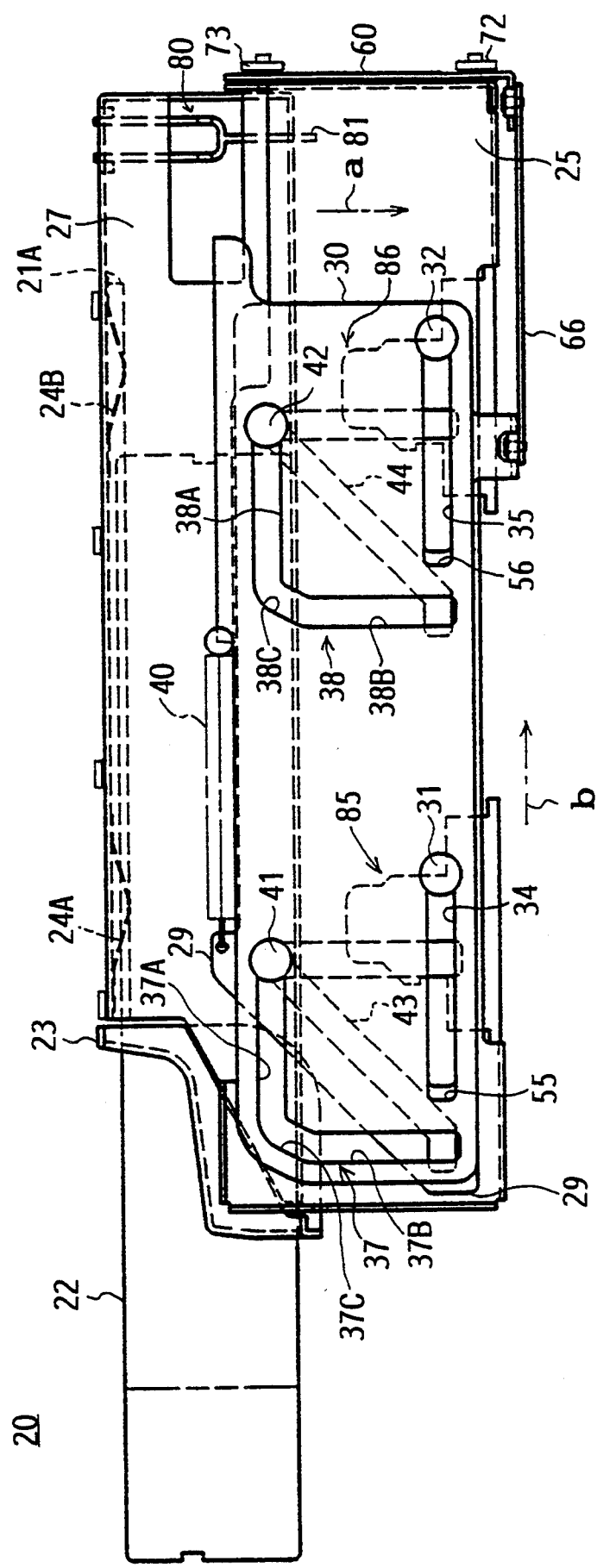
FIG. 3 is a side view of the apparatus of FIG. 2 shown with a stage thereof in a raised position.

Preferred embodiments of this invention will be described with references to the accompanying drawings:

In FIG. 2, 20 designates a cassette inserting and ejecting apparatus of a VTR as a whole, in which a tape cassette 22 is inserted through inserting port 23 to a stage 27 or ejected therefrom through the inserting port 23. The stage 27 is provided with upper and lower guide rails 21A and 21B (FIG. 6) to be engaged with guide grooves 22E and 22F formed in the upper and lower surfaces of the tape cassette 22 so that the tape cassette 22 is inserted into the stage 27 along the guide rails 21A and 21B. Upon such insertion, the tape cassette 22 is held by the guide rails 31A and 21B of the stage 27 so as to be cantilevered by the latter. Further, as shown in FIG. 3, the stage 27 is provided with depending leaf springs 24A and 24B for pressing downwardly on the edge portion of the top surface of the tape cassette, where the guide groove 22E is formed and thereby urging the cassette against the bottom surface of the stage 27.

A chassis 25 (FIG. 2) of the cassette inserting and ejecting apparatus 20 is fixed to a chassis body (not shown) of the VTR, and the stage 27 is movably mounted on the chassis 25 so that the stage 27 can move upward and downward, that is, in the direction of an arrow "a" on FIG. 2 or the direction opposite thereto.

Further, a slide plate 30 is mounted on the chassis 25 so as to permit the slide plate 30 to slide in the direction shown by an arrow "b" or the direction opposite thereto. More specifically, guide projections 31 and 32 fixed to the chassis 25 are slidably engaged in elongated guide holes or slots 34 and 35 of the slide plate 30 so that the guide holes 34 and 35 can slide on the guide projections 31 and 32 and similarly displace the slide plate 30.

Further, guide projections 41 and 42 fixed to the stage 27 are engaged slidably in substantially L-shaped guide holes or slots 37 and 38 in the slide plate 30 so that the guide holes 37 and 38 slide along the guide projections 41 and 42.

An abutting portion 30A extends from an end of the slide plate 30 so that the abutting portion 30A is abutted by end surface 22A of the tape cassette 22 inserted through the inserting port 23. When the tape cassette 22 is inserted and abuts against the abutting portion 30A, further insertion of the cassette in the direction of the arrow "b" moves the slide plate 30 in the direction of the arrow "b".

Therefore, as shown in FIG. 3, when the tape cassette 22 is inserted into the stage 27 in its so-called cassette raised position aligned with the inserting port 23, the slide plate 30 slides in the direction of the arrow "b" in accordance with the inserting operation, and thus the horizontal regions 37A and 38A of the guide holes 37 and 38 move along the guide projections 41 and 42. When the downwardly curved or bent portions 37C and 38C, where the horizontal regions 37A and 38A of the guide holes 37 and 38 intersect the vertical regions 37B and 38B thereof, reach the positions of the guide projections 42 and 42, further sliding motion of the slide plate 30 in the direction of the arrow "b" is stopped by the guide projections 41 and 42 fixed to the stage 27.

At this stage of the operation, the guide projections 41 and 42 fixed to the stage 27 can move downwardly in the direction of the arrow "a" along the vertical regions 37B and 38B of the guide holes 37 and 38 of the slide plate 30. A first cam plate 29 is interposed between the slide plate 30 and chassis 25 and is urged in the direction of the arrow "b" by the urging force of a spring 40, and guide holes 55 and 56 (FIG. 3) extending horizontally in the cam plate 29 are guided by the guide projections 31 and 32 fixed to the chassis 25.

Guide holes 43 and 44 extend obliquely in the cam plate 29 and move with the latter in the direction of the arrow "b". The guide projections 41 and 42 are slidable in the oblique guide holes 43 and 44, and thus, when the cam plate 29 is moved in the direction of the arrow "b" by the spring 40, the guide projections 41 and 42 are moved along the vertical regions 37B and 38B of the guide holes 37 and 38 of the slide plate 30 in the direction shown by the arrow "a".

Figure 4:
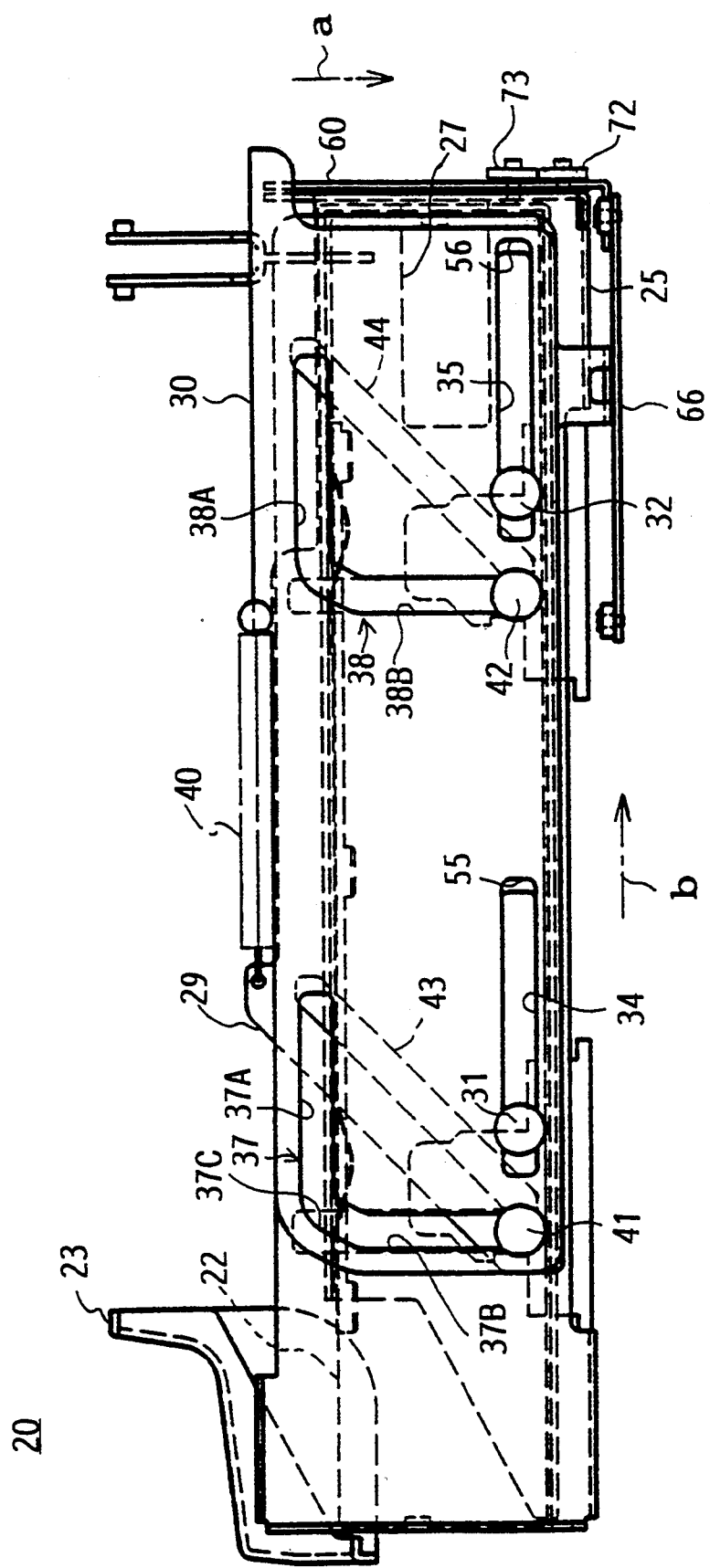
FIG. 4 is a side view similar to that of FIG. 3 but showing the stage in a lowered position.

Therefore, as the guide projections 41 and 42 move, the stage 27 lowers in the direction shown by the arrow "a" and thus the tape cassette 22 is inserted into the stage 27 is lowered therewith to a lowered position (i.e., a recording and reproducing position), as shown in FIG. 4.

Figure 5:
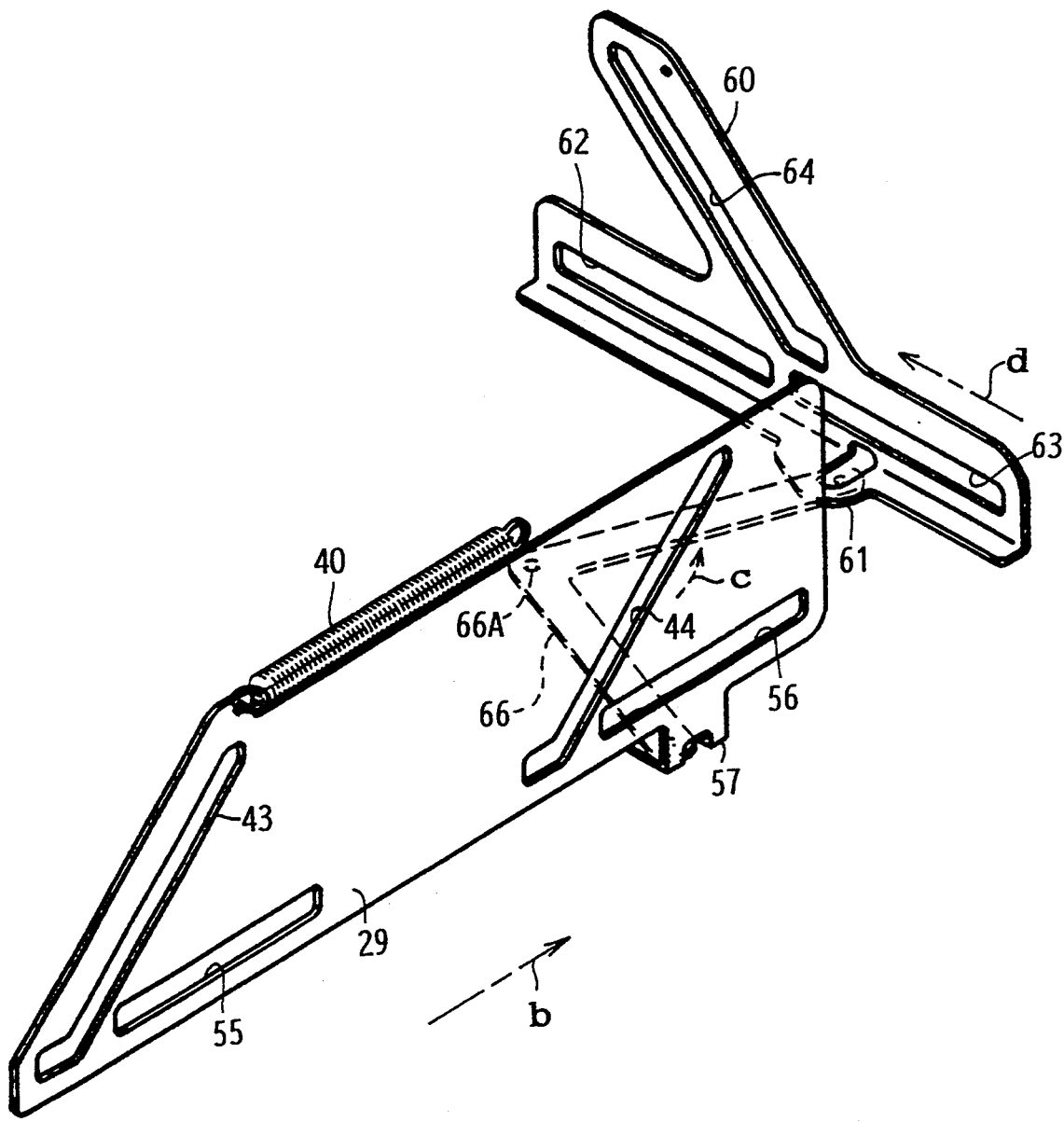
FIG. 5 is a perspective view showing the arrangement of cam plates included in the apparatus of FIG. 2.

As shown in FIG. 5, the first cam plate 29 is connected to a second cam plate 60 through a connecting link 66 at engaging portions 57 and 61, respectively, and the cam plate 60 slides in the direction shown by an arrow "d" or the direction opposite thereto in such a manner that when the cam plate 29 slides in the direction shown by the arrow "b" or the direction opposition thereto, the connecting link 66 rotates in the direction of an arrow "c" or the direction opposite thereto about a pivot or rotation axis 66A. Therefore, as the stage 27 moves from the raised position (FIG. 3) to the lowered position (FIG. 4), the cam plates 29 and 60 slide in the directions of the arrows "b" and "d" respectively, on FIG. 5.

Figure 6:
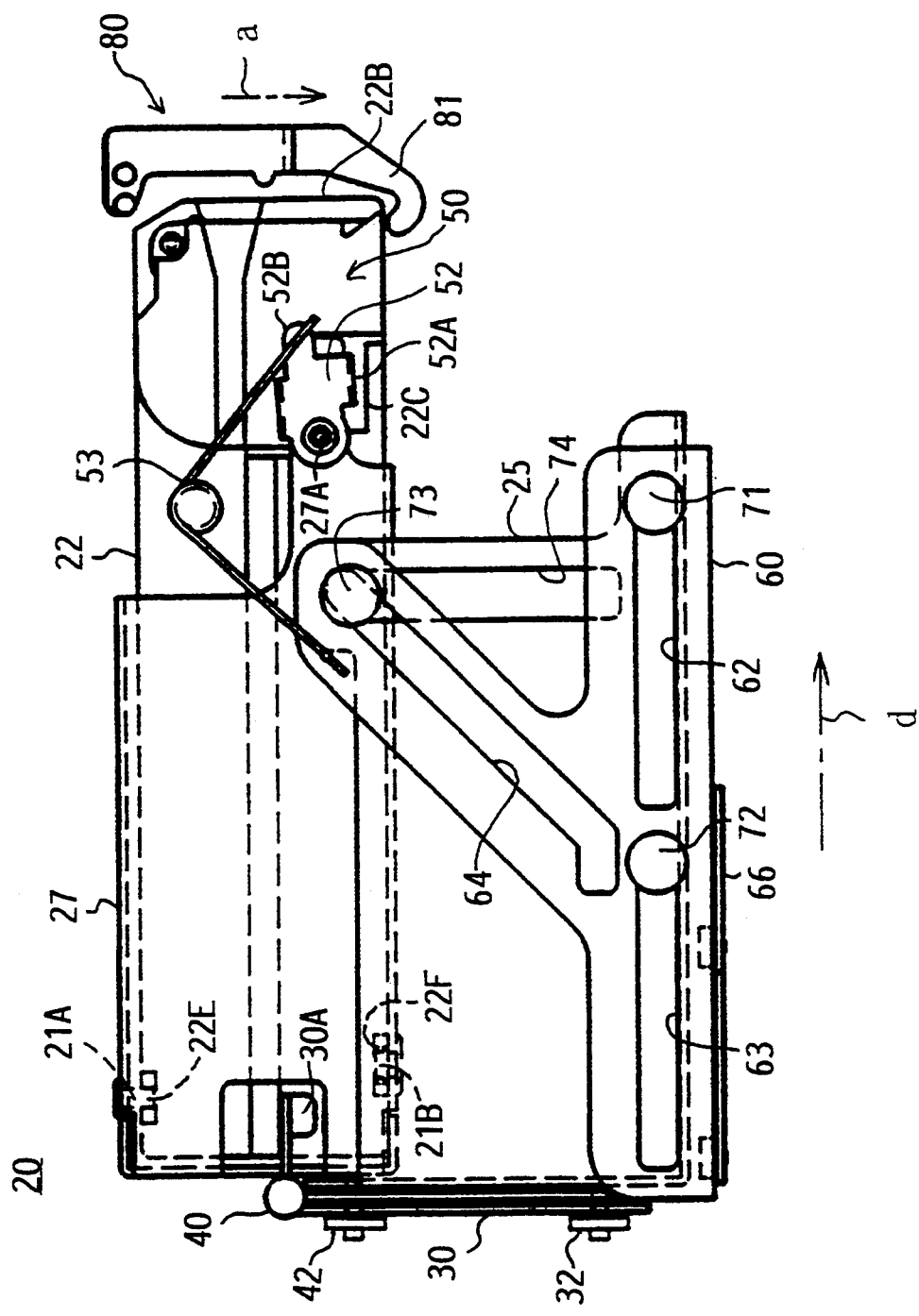
FIG. 6 is an end view of the apparatus of FIG. 2 showing the stage in its raised position.

FIG. 6 shows the tape cassette 22 in the raised position when viewed from the side of the cassette at which the cam plate 60 is disposed. In FIG. 6, the cam please 60 is shown to have elongated guide holes 62 and 63 extending in the sliding direction thereof (the direction of the arrow "d"). The guide holes 62 and 63 are engaged with guide projections 71 and 72 fixed to the chassis 25 to establish the sliding direction (direction of the arrow "d") of the cam plate 60.

Further, a vertical guide hold 74 is provided in the chassis 25 in the direction of the arrow "a" and is slidably engaged with a guide projection 73 fixed to the stage 27 so that the stage 27 is constrained to move only upward and downward or in the direction of the arrow "a" or the direction opposite thereto along the guide hole 74. Further, a guide hole 64 inclined relative to the direction of the arrow "a" on FIG. 6 is provided in the cam plate 60 and engaged with the guide projection 73.

Therefore, when the cam plate 60 slides in the direction shown by the arrow "d", the inclined guide hole 64 moves in the direction of the arrow "d" in parallel therewith. In response to such movement of the inclined guide hole 64, the guide projection 73 engaged with the guide hole 64 is moved downwardly along the guide hole 74 of the chassis 25. Therefore, the stage 27 fixed to the guide projection 73 is also moved downwardly.

As shown in FIG. 6, when the tape cassette 22 is inserted fully from the inserting port 23, the end of the lid 22B of the tape cassette 22 remote from the inserting port 23, confronts a claw 81 of a lid opening and closing member 80. Therefore, when the tape cassette 22 is moved downwardly to the lowered portion together with the stage 27 in response to the sliding movement of the cam plate 29 described above with reference to FIG. 3, the lid 22B of the tape cassette 22 is lifted up by the claw 81 of the lid opening and closing member 80 so that the lid 22B is opened, as shown on FIG. 7.

Figure 7:
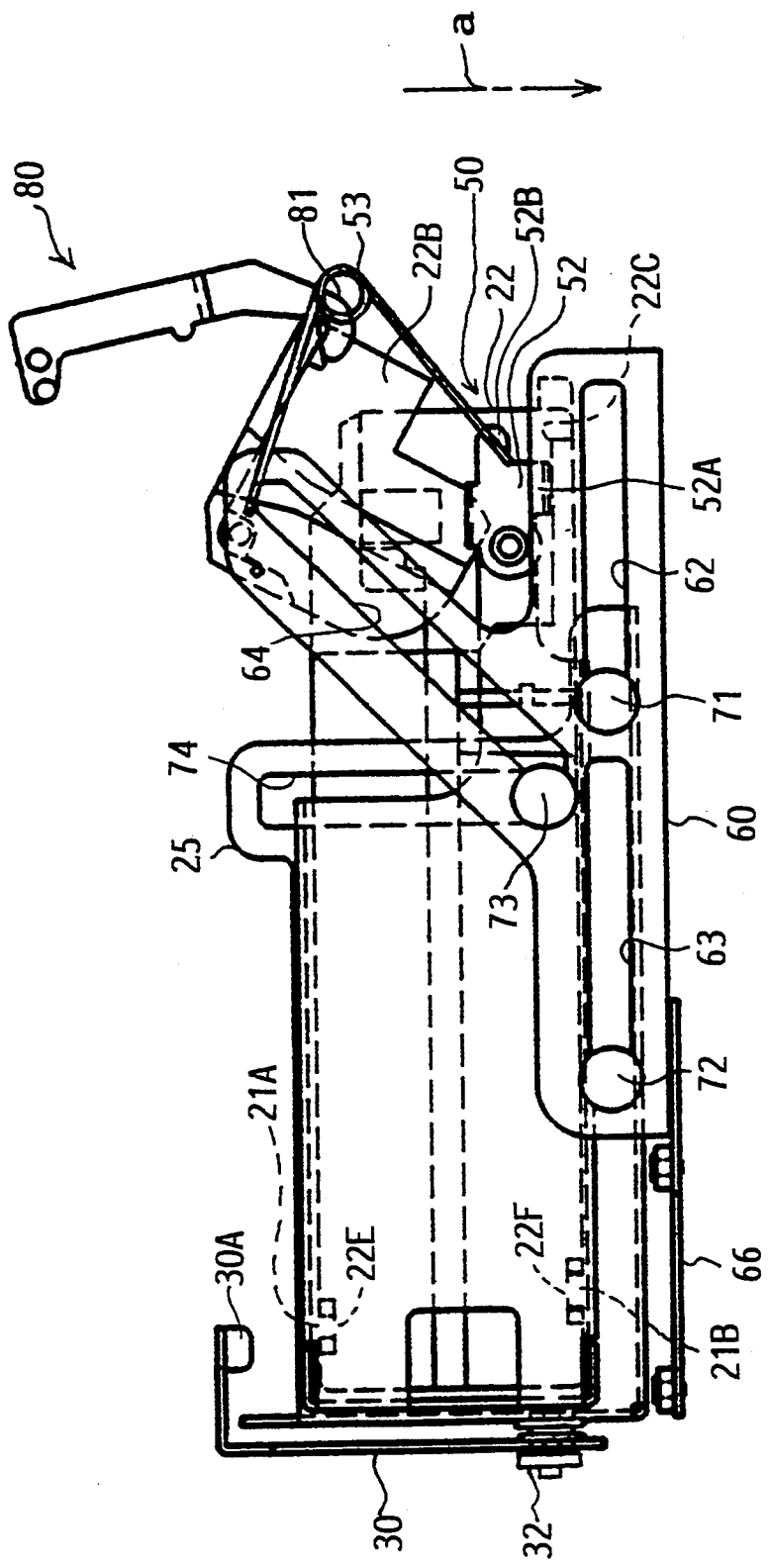
FIG. 7 is an end view similar to that of FIG. 6 but showing the stage in its lowered position.

As shown on FIGS. 2, 6 and 7, the cassette inserting and ejecting apparatus 20 is further provided with a cassette positioning unit 50 for pressing downward (the direction shown by the arrow "a" in FIG. 2) the tape cassette 22 and positioning the same. More specifically, the cassette positioning unit 50 may include a cassette press member 52 having a C-shaped cross section and being engaged with a projection 51 (FIG. 2) extending from the extreme end of the stage 27 so that the cassette press member 52 can rotate within a predetermined range about a pivot 27A (FIG. 6). A torsion or coil spring 53 is attached between an end 52B of the pivoted cassette press member 52 and the cam plate 60. Further, a press portion 52A (FIG. 2) projects from the cassette press member 52 for engagement with a portion of the tape cassette 22 so that the tape cassette 22 is pressed in the direction shown by the arrow "a" by the press portion 52A, as hereinafter described in greater detail.

More specifically, as shown in FIG. 6, the tape cassette 22 has an abutting portion 22C having a flange-shaped flat configuration and extending under the lid 22B of the side of the tape cassette 22 closest to the cam plate 60 when the tape cassette 22 is fully inserted from the inserting port 23 into the stage 27. Thus, when the cassette 22 is fully inserted in the stage 27 and moves downwardly with the latter, the press portion 52A of the cassette press member 52 confronts an upper surface of the abutting portion 22C. As the tape cassette 22 moves downwardly together with the stage 27 in this state, as shown in FIG. 7, a distance between the end 52B of the cassette press member 52 and the cam plate 60 is shortened, and thus the coil or torsion spring 53 provided between the end 52B and the cam plate 60 produces a yieldable force for turning the cassette press member 52 in the direction of the arrow "a" that is in the clockwise direction about the pivot 27A, as viewed on FIG. 7.

As a result, the press 52A of the cassette press member 52 is abutted against the abutting portion 22C of the tape cassette 22 and presses the same in the direction of the arrow "a". Therefore, when the tape cassette 22 is moved downwardly to the lowered position (FIG. 7), the cassette press member 52 presses the tape cassette 22 in the direction of the arrow "a" adjacent the opened lid 22B and thus the tape cassette 22 is stably positioned so that it cannot be easily moved in the upward and downward directions (direction of the arrow "a" or the direction opposite thereto).

In the above arrangement, when the tape cassette 22 is loaded, the urging force of the spring 40 is produced in response to fully inserting the tape cassette 22 through the inserting port 23 into the stage 27 and thereby causing displacement of the slide plate 30 in the direction of the arrow "b" on FIG. 3. When the projections 41 and 42 are aligned with the vertical portions 37B and 38B of slots 37 and 38, the tape cassette 22 is lowered to the lowered position together with the stage 27 by the spring force acting on the first cam plate 29, and through the connecting link 66, on the second cam plate 60.

On the other hand, in the eject operation for removing the tape cassette 22 from the lowered position, the cam plate 29 in the state shown in FIG. 4 is slid in the direction opposite to the arrow "b" by using a capstan motor or the like controlled to act as a drive means. With this arrangement, as the stage 27 is driven upwardly, on increasing urging force is produced by the spring 40. When the stage 27 has risen to its fully raised position, the slide plate 30 locked by the vertical regions 37B and 38B of the guide holes 37 and 38 is released and slides in the direction opposite to the direction shown by the arrow "b" in response to the urging force of the spring 40.

As a result, the tape cassette 22 in the stage 27 is moved relative to the latter in the direction opposite to the direction shown by the arrow "b" by the abutting portion 30A provided on the slide plate 30 and is thereby ejected through the inserting port 23.

As described above, when the cassette 22 is manually loaded into the stage 27, the tape cassette 22 is lowered to the lowered position by the urging force of the spring 40, and when returned to its raised position, the tape cassette can be ejected through the inserting port 23 by the urging force of the spring 40.

With the above arrangement, since the tape cassette 22 is supported in a cantilevered manner by the guide rails 21A and 21B engaged with the guide grooves 22E and 22F in the upper surface and lower surface of the tape cassette 22, a guide on the lid side of the cassette is not needed. As a result, positioning accuracy of the tape cassette 22 can be improved and the size of the stage 27 can be further reduced. The reduction of the size of the stage 27 facilitates maintenance in the vicinity of the reel tables 85 and 86 covered with the cassette inserting and ejecting apparatus 20.

Figure 1:
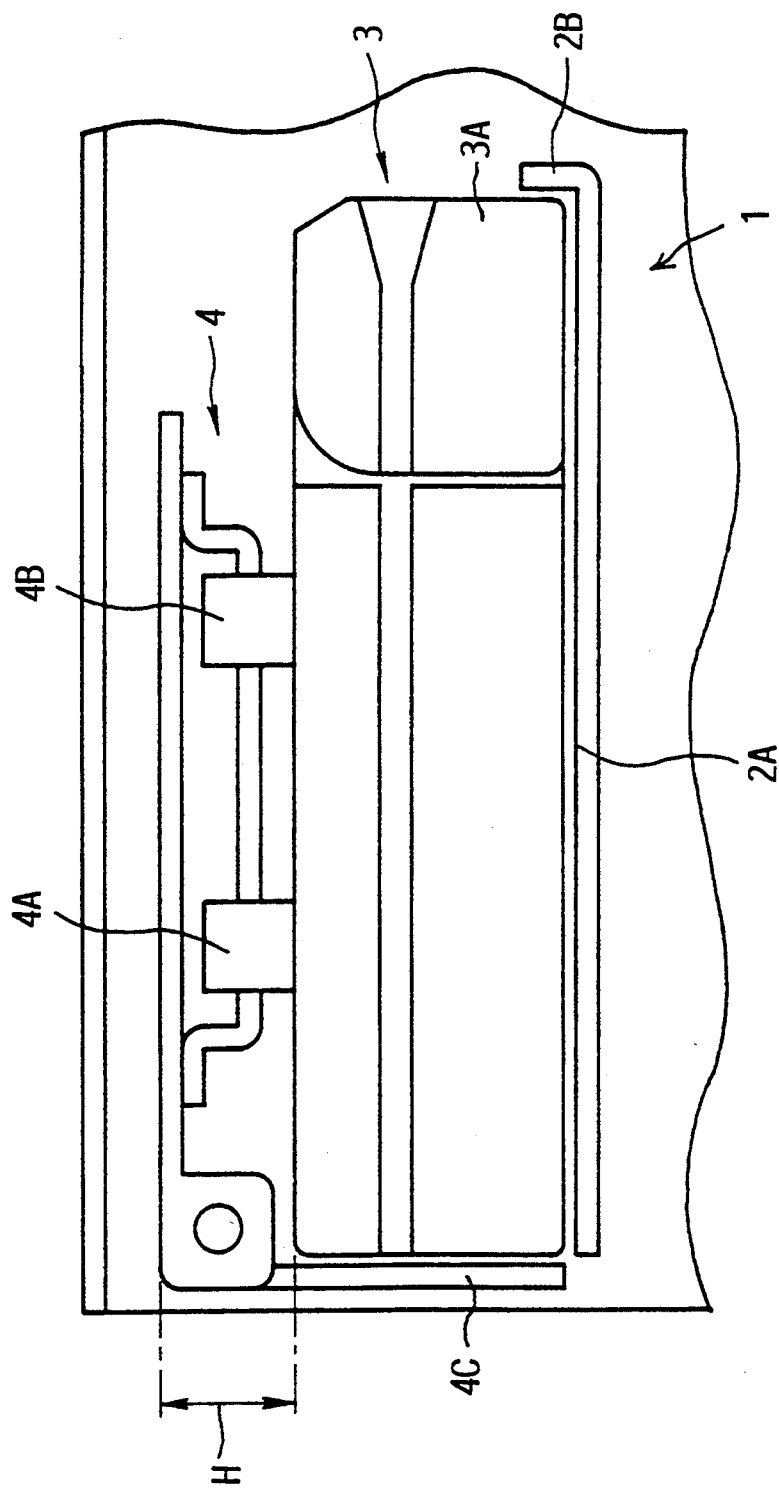
FIG. 1 is a partial side view schematically showing a conventional cassette inserting and ejecting apparatus.

Further, since the tape cassette 22 is positioned by the cassette positioning unit 50, the tape cassette 22 can be positioned in the direction of the arrow "a" (FIG. 2) without the need of the conventional large positioning unit 4 (FIG. 1) for pressing the upper surface of the tape cassette 22, by which the thickness inserting and ejecting apparatus 20 can be reduced.

Further, since the tape cassette 22 is lowered to the lowered position in a cassette loading operation and ejected from the inserting port 23 in a cassette ejecting operation, by using the spring 40 as a drive source, a motor dedicated for the driving operation is not needed, by which the arrangement can be further simplified.

Although the above described embodiment of the invention uses the coil spring 40 as the drive source for inserting and ejecting the tape cassette, this invention is not limited thereto, but in short it is sufficient to use the elastic or yieldable force of an elastic member and thus any other of various drive sources may be used to provide such elastic force.

Further, although the aforesaid embodiment describes the case in which the rail-shaped guide rails 21A and 21B are used as means for guiding the tape cassette 22, this invention is not limited thereto, but other various projecting members may be used.

Furthermore, although the aforesaid embodiment describes the case in which this invention is applied to the cassette inserting and ejecting apparatus 20 for inserting and ejecting the tape cassette 22 of a VTR, this invention is not limited thereto but is widely applicable to a cassette inserting and ejecting apparatus for inserting and ejecting a cassette in various other apparatuses.

While preferred embodiments of the invention have been described above, it will be obvious to those skilled in the art that various changes and modification may be effected therein without departing from the true spirit and scope of the invention as defined in the appended claims.

What is claimed is:

1. A cassette inserting and ejecting apparatus for use with a tape cassette including a substantially rectangular body having a mouth in one long side portion thereof AND containing a tape guided across said mouth, a lid pivoted on said body for movement between opened and closed positions in respect to said mouth, and guide grooves extending along upper and lower surfaces, respectively, of another side portion of said body which is parallel to and remote from said one side portion having said mouth, said apparatus comprising:

means defining an insertion port through which said cassette can be inserted and ejected in a direction parallel with said grooves;

a stage member mounted for movement vertically between a raised position at the level of said insertion port for receiving said cassette inserted through said port and a lowered position at which a cassette received by said stage member is operatively disposed, said stage member including an elongated, channel-shaped side portion cross-sectionally configured to slidably embrace said other side portion of said cassette which is inserted into said stage member in said raised position, and an end portion directed laterally from an end of said channel-shaped side portion which is remote from said insertion port in said raised position;

elongated upper and lower guide members extending longitudinally within said channel-shaped side portion and being directed toward each other to be slidably engaged in said guide grooves in the upper and lower surfaces, respectively, of the cassette body so that the received cassette is cantilevered from said side portion of the stage member; and pressing means on said end portion of the stage member urged into stabilizing engagement with the cassette received in said stage member upon movement of the latter to said lowered position.

2. A cassette inserting and ejecting apparatus as in claim 1; in which said pressing means includes a pressing member pivoted on said end portion of the stage member for angular movement relative thereto between a released position spaced from the cassette received in said stage member and an engaged position in which said pressing member bears downwardly on the cassette body adjacent said one side portion thereof, a cam member displaced laterally in parallel relation to said end portion of the stage member upon movement of the latter between said raised and lowered positions, and spring means connecting said cam member to said pressing member for urging the latter from said released position to said engaged position in response to the displacement of said cam member which accompanies said movement of the stage member from said raised position to said lowered position.

3. A cassette inserting and ejecting apparatus as in claim 2; in which said stage member has projecting guide pins extending from said side portion and end portion, respectively, of the stage member and being slidable in respective vertical slots of a fixed chassis for the mounting of the stage member for said movement vertically between said raised and lowered positions, and said cam member has an inclined slot in which the projecting guide pin extending from the end portion of the stage member is also slidable so that the lateral displacement of said cam member also induces said movement of the stage member between said raised and lowered positions.

4. A cassette inserting and ejecting apparatus as in claim 3; further comprising a slide plate mounted on said chassis for movements relative thereto in directions parallel to the insertion and ejection of a cassette in said stage member, said slide plate having angled slots slidably receiving said projecting guide pins extending from said side portion of the stage member, each of said angled slots including an upper horizontal slot portion in which the respective projecting guide pin is slidable when said stage member is in said raised position and a vertical slot portion depending from one end of the respective horizontal slot portion and in which the respective projecting guide pin slides during movement of said stage member between said raised and lowered positions, another cam member slidable relative to said chassis parallel to said slide plate and having inclined slots in which said projecting guide pins extending from the side portion of the stage member are also slidable, an abutment extending from said slide plate into the path of insertion of said cassette in said stage member in said raised position, a drive spring connected between said slide plate and said other cam member for urging the latter to follow the movements of said slide plate by engagement of the inserted cassette with said abutment so that said drive spring is loaded in response to said movements by engagement of the inserted cassette with the abutment until said projecting guide pins are received in said vertical slot portions of the respective angled slots whereupon the loaded drive spring displaces said other cam member and said inclined slots of the latter cooperate with the respective projecting guide means for propelling said stage member to said lowered position, and connecting link means between said other cam member and the first mentioned cam member so that said first cam member is displaced in response to displacement of said other cam member by said drive spring.

5. A cassette inserting and ejecting apparatus as in claim 4; in which, during upward movement of said projecting guide pins along said vertical slot portions of the respective angled slots, said inclined slots of the other cam member cooperate with the respective projecting guide pins to displace said other cam member in the direction loading said drive spring, and, when said stage member is returned to said raised position, said projecting guide pins come into said horizontal slot portions of the angled slots to permit the loaded drive spring to propel said slide plate in the direction causing said abutment to eject the cassette from said stage member thereunto said insertion port.

* * * * *